US012583277B2

(12) United States Patent
Bouaru et al.

(10) Patent No.: US 12,583,277 B2
(45) Date of Patent: Mar. 24, 2026

(54) DAMPER CONTROL

(71) Applicant: JAGUAR LAND ROVER LIMITED, Warwickshire (GB)

(72) Inventors: Adrian Bouaru, Whitley (GB); Thomas Papanikolaou, Whitley (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 0 days.

(21) Appl. No.: 18/843,425

(22) PCT Filed: Mar. 1, 2023

(86) PCT No.: PCT/EP2023/055226
§ 371 (c)(1),
(2) Date: Sep. 3, 2024

(87) PCT Pub. No.: WO2023/166083
PCT Pub. Date: Sep. 7, 2023

(65) Prior Publication Data
US 2025/0187387 A1       Jun. 12, 2025

(30) Foreign Application Priority Data

Mar. 3, 2022    (GB) ..................................... 2202972

(51) Int. Cl.
B60G 17/015        (2006.01)
B60G 17/0165       (2006.01)
(Continued)

(52) U.S. Cl.
CPC ..... B60G 17/0165 (2013.01); B60G 17/0152 (2013.01); B60G 17/018 (2013.01);
(Continued)

(58) Field of Classification Search
CPC ............ B60G 17/0165; B60G 17/0152; B60G 17/018; B60G 17/08; B60G 2202/24;
(Continued)

(56) References Cited

U.S. PATENT DOCUMENTS 5,579,229 A     11/1996  Maguran, Jr.
6,219,601 B1 *  4/2001   Shono .................. B60G 17/018
                                              701/37
(Continued)

FOREIGN PATENT DOCUMENTS

EP        1302693 A2    4/2003
GB        2577872 A     4/2020

OTHER PUBLICATIONS

International Search Report and Written Opinion of the International Searching Authority for International application No. PCT/EP2023/055226 dated May 15, 2023.
(Continued)

*Primary Examiner* — Toan C To
(74) *Attorney, Agent, or Firm* — Carlson, Gaskey & Olds, P.C.

(57)                ABSTRACT

Aspects relate to control systems for dampers (200), damper systems (300), vehicle suspension systems, vehicles (700), methods (600) and computer software, as claimed in the appended claims. A control system (100) for a damper (200) of a suspension system of a vehicle (700) is provided, the control system comprising one or more controllers. The control system (100) is configured to: receive a temperature signal (402) indicative of an ambient temperature in an environment in which the vehicle is located; determine (404) if the damper is operating outside a predetermined ambient temperature range in dependence on the temperature signal; and when the damper is determined to be operating outside the predetermined ambient temperature range, output a modified electrical current request (406) to control the
(Continued)

damper, the modified electrical current request being modified with respect to an electrical current request output to the damper when the damper is determined to be operating within the predetermined ambient temperature range.

18 Claims, 5 Drawing Sheets

(51) Int. Cl.
    *B60G 17/018*         (2006.01)
    *B60G 17/08*          (2006.01)

(52) U.S. Cl.
    CPC .......... *B60G 17/08* (2013.01); *B60G 2202/24*
        (2013.01); *B60G 2204/62* (2013.01); *B60G*
        *2206/41* (2013.01); *B60G 2400/8422*
        (2013.01); *B60G 2500/104* (2013.01); *B60G*
        *2600/182* (2013.01); *B60G 2800/162*
        (2013.01); *B60G 2800/916* (2013.01)

(58) Field of Classification Search
    CPC ............ B60G 2204/62; B60G 2206/41; B60G
        2400/8422; B60G 2500/104; B60G
        2600/182; B60G 2800/162; B60G
        2800/916
    See application file for complete search history.

(56) References Cited

U.S. PATENT DOCUMENTS

| | | | | |
|---|---|---|---|---|
| 9,038,789 | B2 * | 5/2015 | West | F16F 1/3615 |
| | | | | 188/267.2 |
| 9,527,364 | B2 * | 12/2016 | Mohamed | B60G 17/019 |
| 10,369,856 | B2 * | 8/2019 | Rutkowski | B60G 13/06 |
| 10,369,858 | B2 * | 8/2019 | Morita | B60G 17/018 |
| 11,794,543 | B2 * | 10/2023 | Ericksen | B60G 17/017 |
| 12,139,203 | B2 * | 11/2024 | Manternach | B60G 17/002 |
| 2011/0093166 | A1 | 4/2011 | Li et al. | |
| 2014/0151169 | A1 * | 6/2014 | Wehr | F16F 9/52 |
| | | | | 188/269 |
| 2014/0244112 | A1 * | 8/2014 | Dunaway | B60G 13/00 |
| | | | | 701/37 |
| 2016/0159188 | A1 * | 6/2016 | Mohamed | F16F 15/002 |
| | | | | 701/37 |
| 2017/0166027 | A1 * | 6/2017 | Rutkowski | B60G 13/06 |
| 2022/0055435 | A1 | 2/2022 | Bruno et al. | |

OTHER PUBLICATIONS

Combined Search and Examination Report under Sections 17 and 18(3) for Application No. GB2202972.2 dated Sep. 2, 2022.

* cited by examiner

Figure 5
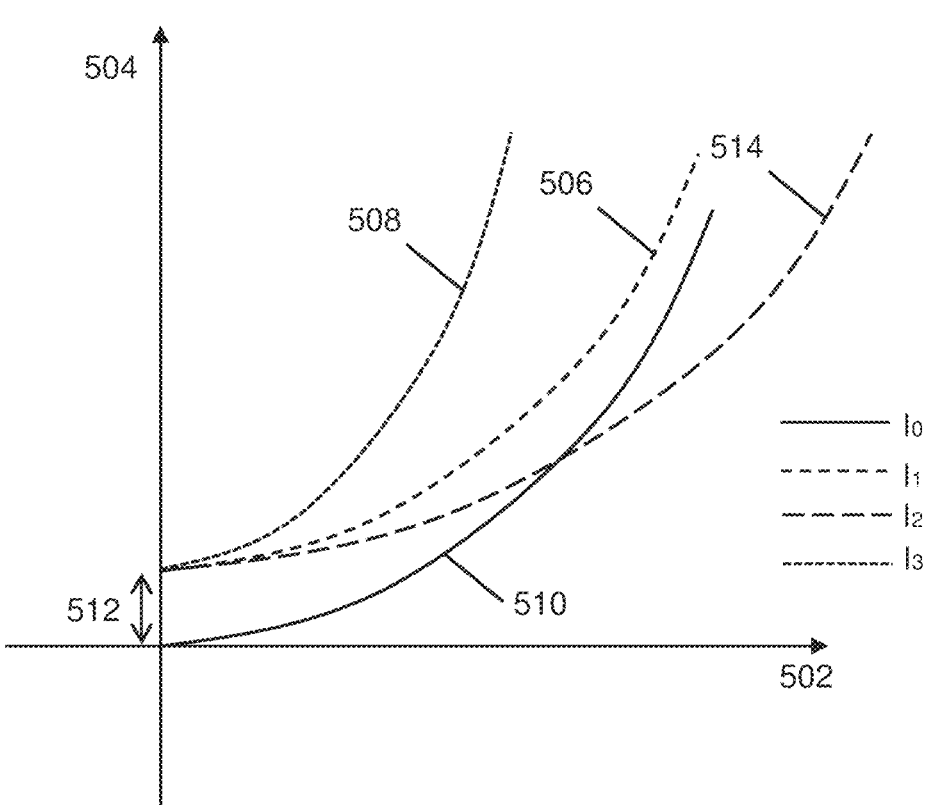
Figure 6
Figure 7
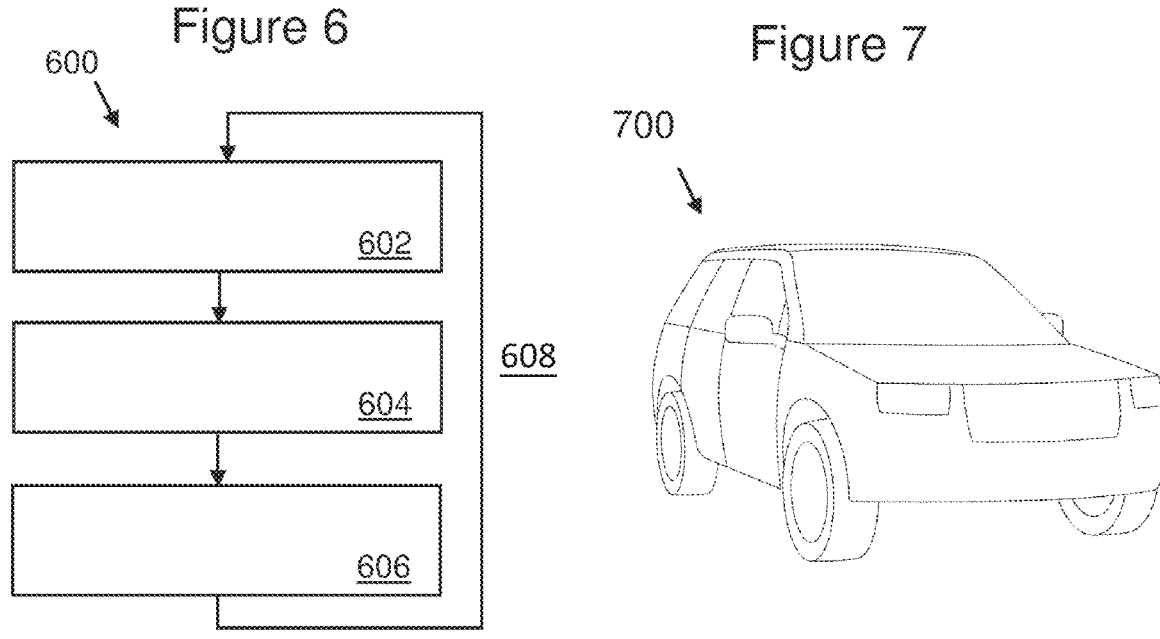

DAMPER CONTROL

TECHNICAL FIELD

The present disclosure relates to dampers such as those used in vehicle suspension systems; in particular, so-called adaptive dampers, in which the amount of damping provided may be varied. Aspects relate to control systems for such dampers, damper systems, vehicle suspension systems, vehicles, methods and computer software, as claimed in the appended claims.

BACKGROUND

Vehicles (e.g. petrol, diesel, electric, hybrid) may comprise active suspension systems for maintaining vehicle stability and ride comfort. Semi-active, or active, suspension systems may comprise dampers as part of the suspension system. Such suspension systems may comprise electronically controlled dampers ("eDampers") which utilise mechatronic systems to provide vehicle damping.

Such suspension systems may include a cascade of: (a) high level vehicle control to generate a system demand signal (for example a force demand) to influence vehicle motion; (b) low level control providing control signals to an actuator of the damper (e.g. for valve control) to deliver the demanded signal from the high level control, and (c) a damper assembly, comprising mechanical components to deliver the physical manifestation of the demanded signal (i.e. the physical damper unit providing vehicle movement damping).

These systems comprise hardware components which may be temperature sensitive. The temperature of an individual hardware component may be considered to be a function of e.g. the local ambient temperature of the component, airflow passing over the component, and the operating state of the component (e.g. due to self-heating in operation). The mechanical and electrical performance of the component may be influenced by a plurality of control parameters (boundary conditions) such as the damper valve solenoid current, damper valve solenoid temperature, damper fluid temperature, high level control strategy, and more. #

The dynamic performance delivered by such suspension components in a suspension system can vary with local ambient temperature and vehicle usage (e.g. on-road, off-road, motorway, race track). A usual way to achieve a reasonable compromise between all use cases and performance metrics is to tune the suspension system around a nominal ambient temperature. This may lead to reduced performance in environments outside the nominal ambient temperature, such as hot climates, since the temperature can affect the properties of the suspension system components.

It is an aim of the present disclosure to address one or more of the disadvantages associated with the prior art.

SUMMARY OF THE INVENTION

Aspects and embodiments of the invention provide control systems for a damper of a suspension system of a vehicle, damper systems, vehicle suspension systems, vehicles, methods and computer software, as claimed in the appended claims.

According to an aspect there is provided a control system for a damper of a suspension system of a vehicle, the control system comprising one or more controllers, the control system configured to: receive a temperature signal indicative of an ambient temperature in an environment in which the vehicle is located; determine if the damper is operating outside a predetermined ambient temperature range in dependence on the temperature signal; and when the damper is determined to be operating outside the predetermined ambient temperature range, output a modified electrical current request to control the damper, the modified electrical current request being modified with respect to an electrical current request output to the damper when the damper is determined to be operating within the predetermined ambient temperature range.

A damper may comprise: first and second fluid chambers; a hydraulic fluid located in the first and second chambers; a piston; and an aperture having a variable aperture size, the aperture located between the first and second chambers, wherein the variable aperture size is controlled by a received electrical current request. For example, an electrical current request may control the aperture to have a first size, and a modified electrical current request may control the aperture to have a second size different to the first size.

The predetermined ambient temperature range may be defined by a lower temperature threshold and an upper temperature threshold, e.g. between −10° C. and 50° C., between +10° C. and 40° C., or between +15° C. and 35° C.

Advantageously, when the temperature in the environment of the vehicle is outside the predetermined ambient temperature range, then the control of the dampers may be adjusted accordingly to maintain the required control and counteract effects of the ambient temperature on the damper operation. For example, in a high environmental temperature (e.g. when driving in a hot country), the dampers may require a different level of control to maintain the same level of damping as if the vehicle was operating on an equivalent surface but at a colder ambient temperature. This may arise because the hydraulic fluid in the dampers may change viscosity with ambient temperature (i.e. become less viscous as the temperature increases).

Advantageously, control of the dampers may be maintained by providing an adjustment to the electronic signals used to control the dampers (i.e. the solution may be implemented using software), without necessarily including additional physical components to counteract the effects of ambient temperature outside the predetermined ambient temperature range, such as water cooling conduits or air flow channels to cool the dampers when operating in a hot climate, or a heater element to warm the dampers when operating in a cold climate.

According to an aspect there is provided a control system for a damper of a suspension system of a vehicle, the control system comprising one or more controllers, the control system configured to: receive a signal indicative of a current operating parameter of the vehicle, wherein the damper operation is dependent on the operating parameter; determine if the current operating parameter is outside a predetermined default operating parameter range in dependence on the signal; and when the current operating parameter is outside the predetermined default operating parameter range, output a modified electrical current request to control the damper, the modified electrical current request modified with respect to an electrical current request output to the damper when the current operating parameter is within the predetermined default operating parameter range.

The operating parameter may comprise a temperature indication; for example a damper valve solenoid temperature, a damper fluid temperature, an engine oil temperature, a transmission oil temperature, or a tire temperature. The operating parameter may comprise a parameter or combination of parameters from which an indication of temperature may be derived, such as electrical current or power, e.g. a damper valve solenoid current.

The modified electrical current request may comprise the electrical current request offset by a constant damping level electrical current. Thus by applying an offset, effects of the ambient temperature on the properties of the damper may be counteracted to maintain a desired damper operation by shifting the result of an applied current by the offset.

The modified electrical current request may comprise the electrical current request, multiplied by an electrical current multiplier factor. Thus by multiplying the current request by a multiplier factor, effects of the ambient temperature on the properties of the damper may be counteracted to maintain a desired damper operation by scaling an adjustment of the modification to an applied current according to the magnitude of the applied current. Thus as the current applied increases, so too does the extent of the scaling.

The control system may be configured to determine a magnitude of the electrical current multiplier factor in dependence on a detected velocity of the damper in operation. A "damper in operation" may be understood to mean that the damper is in use in an operative vehicle (i.e. the vehicle is being driven). A detected velocity of the damper in operation may be understood to mean that the velocity of one part of the damper moving with respect to another part of the damper to provide a damping effect, rather than the velocity of the damper as a part of the velocity of the vehicle driving along.

The modified electrical current request may comprise the electrical current request, multiplied by an electrical current multiplier factor, and offset by a constant damping level electrical current.

The damper may be in operation moving at a first velocity, and the modified electrical current request may comprise the electrical current request offset by a constant damping level electrical current when the first velocity is within a first velocity range. For example, between a velocity of 0 mm/s to 100 mm/s (a first velocity range), a constant damping level electrical current offset may be applied to the electrical current request.

The damper may be in operation moving at a second velocity within a second velocity range, wherein the second velocity range is greater than a first velocity range, and the modified electrical current request may comprise the electrical current request multiplied by an electrical current multiplier factor and offset by the constant damping level electrical current when the second velocity is within the second velocity range. For example, between a velocity of 100 mm/s to 300 mm/s (a second velocity range), a constant damping level electrical current offset and a multiplier factor may be applied to the electrical current request.

The control system may be configured to periodically receive the temperature signal; and re-determine if the damper is operating outside the predetermined ambient temperature range in dependence on the received temperature signal.

When the damper is determined to operate above the predetermined ambient temperature range, the control system may be configured to output a modified electrical current request which is a higher electrical current with respect to an electrical current request output to the damper when the damper is determined to be operating within the predetermined ambient temperature range. When the damper is determined to operate below the predetermined ambient temperature range, the control system may be configured to output a modified electrical current request which is a lower electrical current with respect to an electrical current request output to the damper when the damper is determined to be operating within the predetermined ambient temperature range. For example, fluid in a damper may become less viscous as ambient temperature increases and thus the damper may require a higher current to be provided to control the damper stiffness to a desired level compared with operating at a lower ambient temperature. Conversely, fluid in a damper may become more viscous as ambient temperature decreases, and thus the damper may require a lower current to be provided to control the damper stiffness to a desired level compared with operating at a higher ambient temperature. In other examples the converse may apply, and a lower current may be required to control a damper operating at a higher ambient temperature, and a higher current may be required to control a damper operating at a lower ambient temperature, to achieve the desired damping effect.

The control system may be configured to determine the modified electrical current request by retrieving the modified electrical current request from a memory. The control system may be configured to determine the modified electrical current request by determining the modified electrical current request in accordance with one or more detected vehicle parameters.

According to an aspect there is provided a damper system for a vehicle, comprising: a control system as disclosed herein, and a damper configured to receive the modified electrical current request from the control system to control the damper.

According to an aspect there is provided a vehicle suspension system comprising a damper system as disclosed herein.

According to an aspect there is provided a vehicle comprising a control system as disclosed herein, a damper system as disclosed herein, or a vehicle suspension system as disclosed herein.

According to an aspect there is provided a method of operation of a control system for a damper of a suspension system of a vehicle, the method comprising: receiving a temperature signal indicative of an ambient temperature in an environment in which the vehicle is located; determining if the damper is operating outside a predetermined ambient temperature range in dependence on the temperature signal; and when the damper is determined to be operating outside the predetermined ambient temperature range, outputting a modified electrical current request to control the damper, the modified electrical current request modified with respect to an electrical current request output to the damper when the damper is determined to be operating within the predetermined ambient temperature range.

The method may comprise periodically receiving the temperature signal; and re-determining if the damper is operating outside the predetermined ambient temperature range in dependence on the received temperature signal.

According to an aspect there is provided computer software which, when executed on a processor of a control system as disclosed herein is arranged to perform a method as disclosed herein. Optionally the computer software is stored on a computer readable medium. Optionally the computer software is tangibly stored on a computer readable medium.

According to an aspect there is provided a non-transitory, computer-readable storage medium storing instructions thereon that, when executed by one or more electronic processors of a control system as disclosed herein, causes the one or more electronic processors to carry out a method as disclosed herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more examples will now be described, by way of example only, with reference to the accompanying drawings, in which:

FIG. 5 shows an example plot of method according to examples disclosed herein FIG. 6 shows an example method according to examples disclosed herein; and FIG. 7 illustrates an example vehicle according to examples disclosed herein.

DETAILED DESCRIPTION

Figure 2:
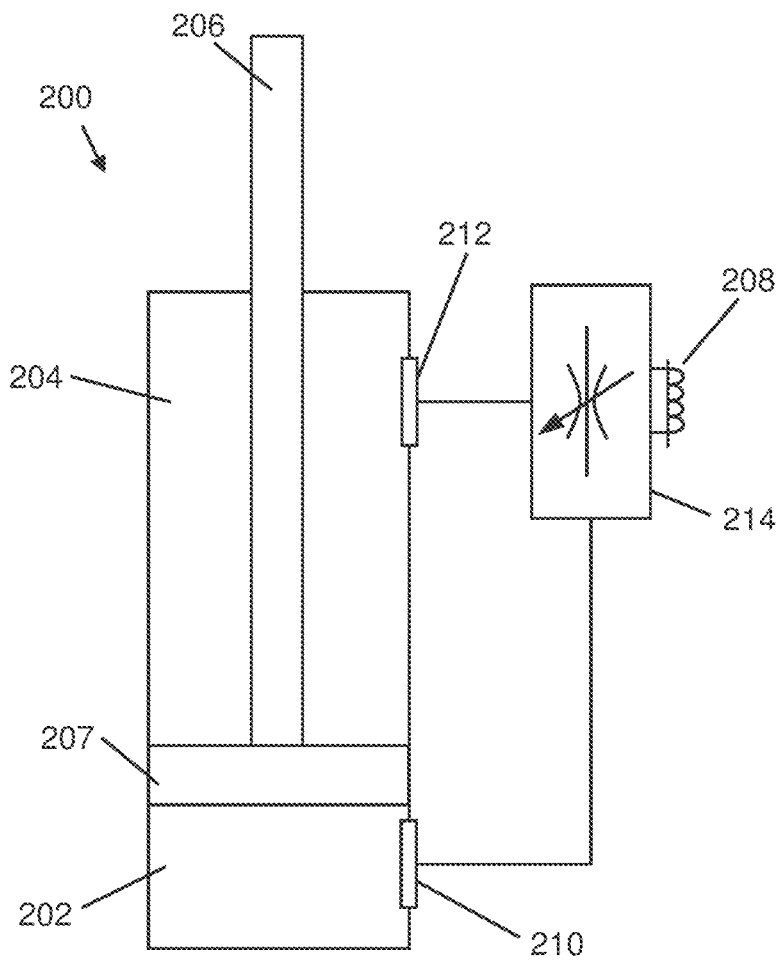
FIG. 2 shows, schematically, a damper according to examples disclosed herein.

Semi-active, or active, suspension systems may comprise electronically controlled dampers which utilise mechatronic systems to provide vehicle damping. FIG. 2 schematically illustrates an electronically controlled damper. The size of at least one aperture between fluid chambers may be controlled using an electronic signal. For example, sending a higher current signal may cause the aperture to decrease in size, making it harder for fluid to pass through it. By controlling the size of the aperture, the ease with which hydraulic fluid in the damper can pass from one chamber to the adjoining chamber is changed, thereby changing the damping provided by that damper.

The dampers comprise hardware components which may be temperature sensitive. For example, the viscosity of the hydraulic fluid may vary with temperature, which in turn may be a function of the local ambient temperature, airflow passing over the component, and/or the operating state of the component, for example. The dynamic performance delivered by such suspension components can therefore vary with local ambient temperature and vehicle usage (e.g. on-road, off-road, motorway, race track).

In high or low ambient temperature conditions (i.e. outside a default operating temperature range for which the damping systems is nominally tuned), the damping systems may operate at a temperature point which makes the nominal dynamic tuning sub-optimal. This may lead to a degradation in damping performance, which in turn may cause loss of comfort to the occupant and may increase the wear on parts of the vehicle through suboptimal damping. By improving controller functionality to manage system thermal behaviour, the damping system dynamic performance may be improved and ride/handling degradation may be mitigated against.

Examples disclosed herein provide a control system for a damper of a suspension system of a vehicle. The control system is configured to receive a temperature signal indicative of an ambient temperature in an environment in which the vehicle is located. More than one temperature signal may be received in some examples. In either case, the environmental temperature in which the suspension system is operating is obtained. Then, the control system is configured to determine if the damper is operating outside a predetermined ambient temperature range in dependence on the temperature signal or signals. The predetermined ambient temperature range may be defined by a lower temperature threshold and an upper temperature threshold, e.g. between −10° C. and 50° C., between +10° C. and 40° C., or between +15° C. and 35° C. For example, the predetermined ambient temperature range may be between +10° C. and 40° C., and if the environmental temperature is detected to be 45° C. then the damper is determined to be operating outside the "default" predetermined ambient temperature range.

When the damper is determined to be operating outside the predetermined ambient temperature range, the control system is configured to output a modified electrical current request to control the damper. The modified electrical current request is modified with respect to an electrical current request output to the damper when the damper is determined to be operating within the predetermined ambient temperature range. By providing a modified electrical current the damper behaviour due to the ambient temperature may be compensated for to provide improved damping compared to control without accommodating the effects of ambient temperature on damper behaviour/properties.

Thus, when damping control is enabled, the system uses the estimated component local temperature obtained from the received temperature signal(s) to decide whether the vehicle is in a possible degraded/suboptimal performance state. If the system estimates a possible degraded state, it may use the estimated component local temperature to change the minimum damping level (i.e. apply a damping offset) and/or scale the current used to control the damper aperture (i.e. the aperture between damper fluid chambers). By changing the current used to control the damper aperture (s), the damping performance may be temporarily enhanced in high or low ambient temperature conditions, therefore reducing the ride/comfort degradation that may arise in ambient temperature conditions outside a nominal operating temperature range.

Systems disclosed herein may use the ambient temperature to manipulate the damping force request from the control system to the dampers, to compensate for reduced damping performance during "dynamic" events. A dynamic event may be considered to be a short term, high impact event, such as crossing a speed bump, driving over a pothole, or driving over a bump encountered when driving on an uneven surface. That is, a quick, short term, change in damper velocity may arise. The system may detect the dynamic event, and provide a "manipulated" output which is fed to the damper, so that the final current request to the actuators of the damper is altered to account for the dynamic event effects on the damper. If the algorithm detects that the system is not in a degraded state anymore, it may then switch back to nominal (non-manipulated) current damping control.

By altering the control current provided to the dampers to account for the ambient temperature in different driving conditions, the damper firmness may be controlled by changing the aperture size between fluid chambers in the damper. Thus examples disclosed herein may provide for better damping control, allow for better ride and handling, reduce ride degradation effects, and/or increase the damping system response to extreme inputs/dynamic events (e.g. kerb strike events).

Figure 1:
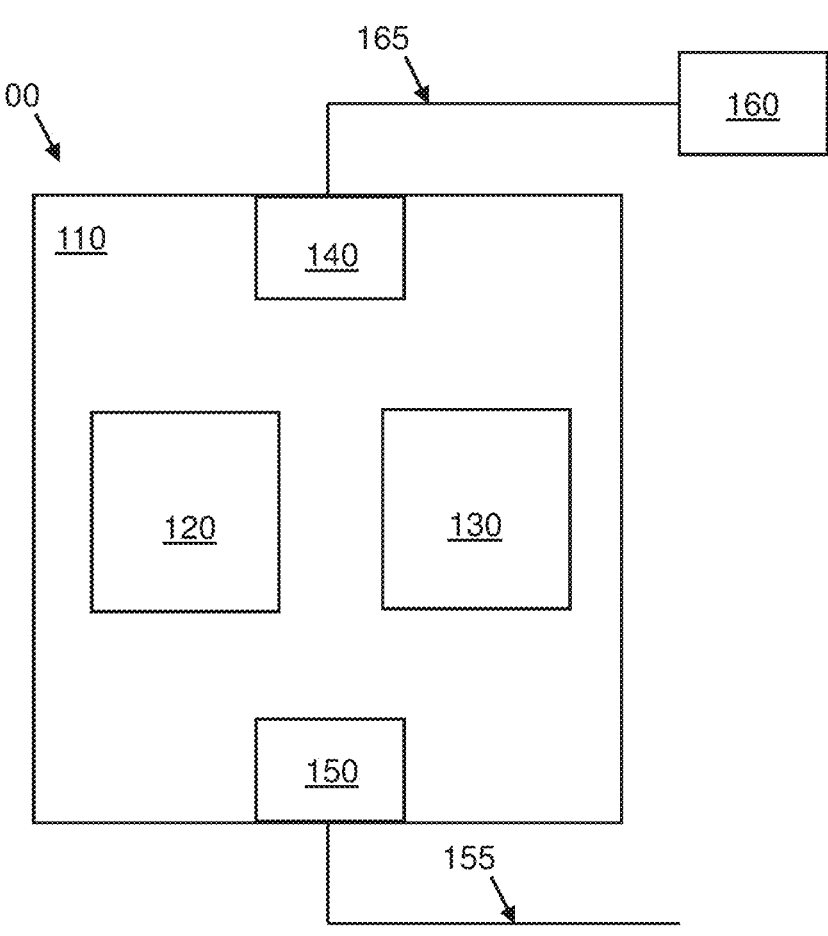
FIG. 1 shows a control system for a damper according to examples disclosed herein.

FIG. 1 shows a control system 100 for a damper of a suspension system of a vehicle. The vehicle may be a wheeled vehicle, such as an automobile, or may be another type of vehicle. The control system 100 comprises one controller 110, although in other examples there may be plural controllers 110. The controller 110 comprises processing means 120 and memory means 130. The processing means 120 may be one or more electronic processing device 120 which operably executes computer-readable instructions. The memory means 130 may be one or more memory device 130. The memory means 130 is electrically coupled to the processing means 120. The memory means 130 is configured to store instructions, and the processing means 120 is configured to access the memory means 130 and execute the instructions stored thereon.

The controller 110 comprises an input means 140 and an output means 150. The input means 140 may comprise an electrical input 165 of the controller 110. The output means 150 may comprise an electrical output 155 of the controller 110. The input 140 is arranged to receive one or more input signals via the electrical input 165, for example from an external computing device 160.

The control system 100 is configured to receive a temperature signal 165 indicative of an ambient temperature in an environment in which the vehicle is located, for example from an ambient temperature sensor 160 of the vehicle and/or possibly from a remote weather station or similar local to the vehicle location. The processing means 120 is configured to determine if the damper is operating outside a predetermined ambient temperature range in dependence on the temperature signal 165. The output 150 is configured to, when the damper is determined to be operating outside the predetermined ambient temperature range, output a modified electrical current request 155 to control the damper. The modified electrical current request 155 is modified with respect to an electrical current request output to the damper 45 when the damper is determined to be operating within the predetermined ambient temperature range. The provided electrical current is used in the damper to control damper firmness.

In some examples, the control system 100 is configured to receive a signal 165 from an external source 160 indicative of a current operating parameter of the vehicle, wherein the damper operation is dependent on the operating parameter. The operating parameter, for example, comprise a temperature indication; for example a damper valve solenoid temperature, a damper fluid temperature, an engine oil temperature, a transmission oil temperature, or a tire temperature. The operating parameter may, for example, comprise a parameter or combination of parameters from which an indication of temperature may be derived, such as electrical current or power, e.g. a damper valve solenoid current. The processing means 120 is configured to determine if the current operating parameter is outside a predetermined default operating parameter range in dependence on the signal 165. The output 150 is configured to, when the current operating parameter is outside the predetermined default operating parameter range, output a modified electrical current request 155 to control the damper. The modified electrical current request 155 is modified with respect to an electrical current request output to the damper when the current operating parameter is within the predetermined default operating parameter range.

Advantageously, when the ambient temperature in the environment of the vehicle is outside the predetermined ambient temperature range, then the control of the dampers may be adjusted accordingly to maintain the required control and counteract effects of the ambient temperature (and counteract effects of the damper temperature due to damper operation) on the damper operation. For example, in a high environmental temperature (e.g. when driving in a hot country), the dampers may require a different level of control to maintain the same level of damping as if the vehicle was operating on an equivalent surface but at a colder ambient temperature. This may arise because the hydraulic fluid in the dampers may change viscosity with ambient temperature (i.e. become less viscous as the temperature increases). Thus by changing the current used to control the damper firmness, the damping may be increased to counteract the effect of a high ambient temperature which acts to reduce the damping firmness (e.g. by reducing the viscosity of damper fluid in the damper).

Advantageously, control of the dampers may be maintained by providing an adjustment to the electronic signals used to control the dampers (i.e. the solution may be implemented using software), without necessarily including additional physical components to counteract the effects of ambient temperature outside the predetermined ambient temperature range, such as water cooling conduits or air fins to cool the dampers when operating in a hot climate, or a heater element to warm the dampers when operating in a cold climate.

FIG. 2 schematically shows an electronically controlled single valve damper 200. Examples disclosed herein may be applied to various types of electronically controlled damper 200, including single valve dampers and twin valve dampers. The damper 200 comprises a first fluid chamber 202, a second fluid chamber 204, a rod 206, a movable piston 207 attached to an end of the rod 206 and separating the first and second chambers 202, 204, and a current controlled valve 208. The valve 208 is located between a first orifice 210 of a wall of the first fluid chamber 202 and a second orifice 212 of a wall of the second fluid chamber 204. The valve 208 contains a variable size aperture 214 which controls the rate of flow of fluid between the chambers 202, 204 through the orifices 210, 212 and aperture 214 of the damper 200. The more restricted the flow (i.e. the smaller the aperture 214), the firmer the stroke of the damper's piston 206. The size of the aperture 214 determines how fast this flow can take place, and thus determines the firmness of the damper 200. A larger aperture 214 allows for easier fluid flow and less firm damping. A smaller aperture 214 makes it more difficult for fluid to flow and the damping firmness is increased.

Figure 3:
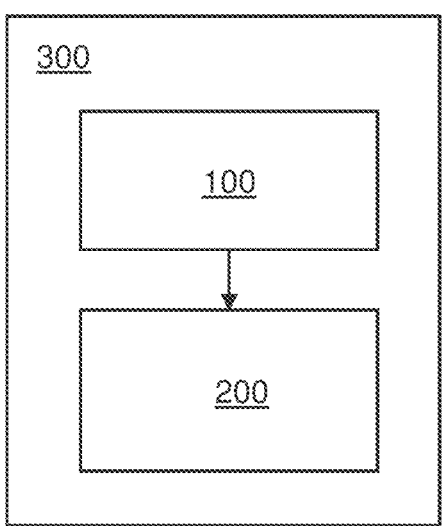
FIG. 3 shows a system comprising a damper and a control system according to examples disclosed herein.

FIG. 3 shows a damper system 300 for a vehicle. The system 300 comprises at least one variable damper 200, such as the variable damper 200 described in relation to FIG. 2, configured to receive the modified electrical current request from the control system to control the damper, and a control system 100 such as that described in relation to FIG. 1. Such a system 300 may be part of a vehicle suspension system. The provided electrical current request may control the size of an aperture in the damper to change the damper stiffness as described above. The control system 100 may control more than one damper, e.g. four dampers, once at each wheel of the vehicle. In some examples there may be a dedicated control system from each damper. In some examples there may be a front control system controlling the front left and right dampers, and a rear control system controlling the rear left and right dampers. Other arrangements may be envisaged.

Figure 4A:
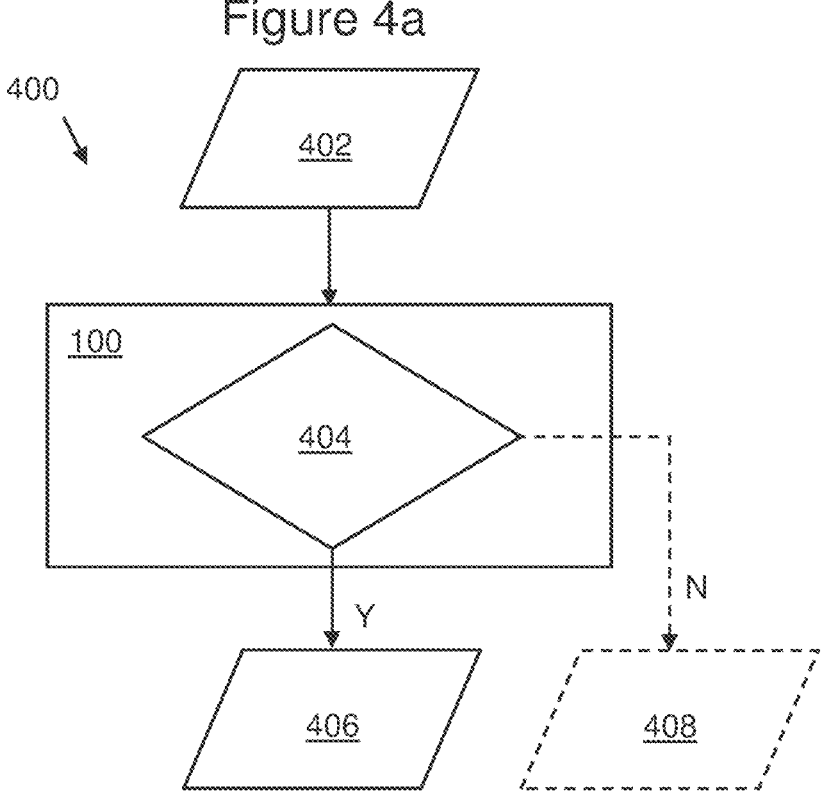
FIGS. 4a-4b show example processes taking place by a control system according to examples disclosed herein.
Figure 4B:
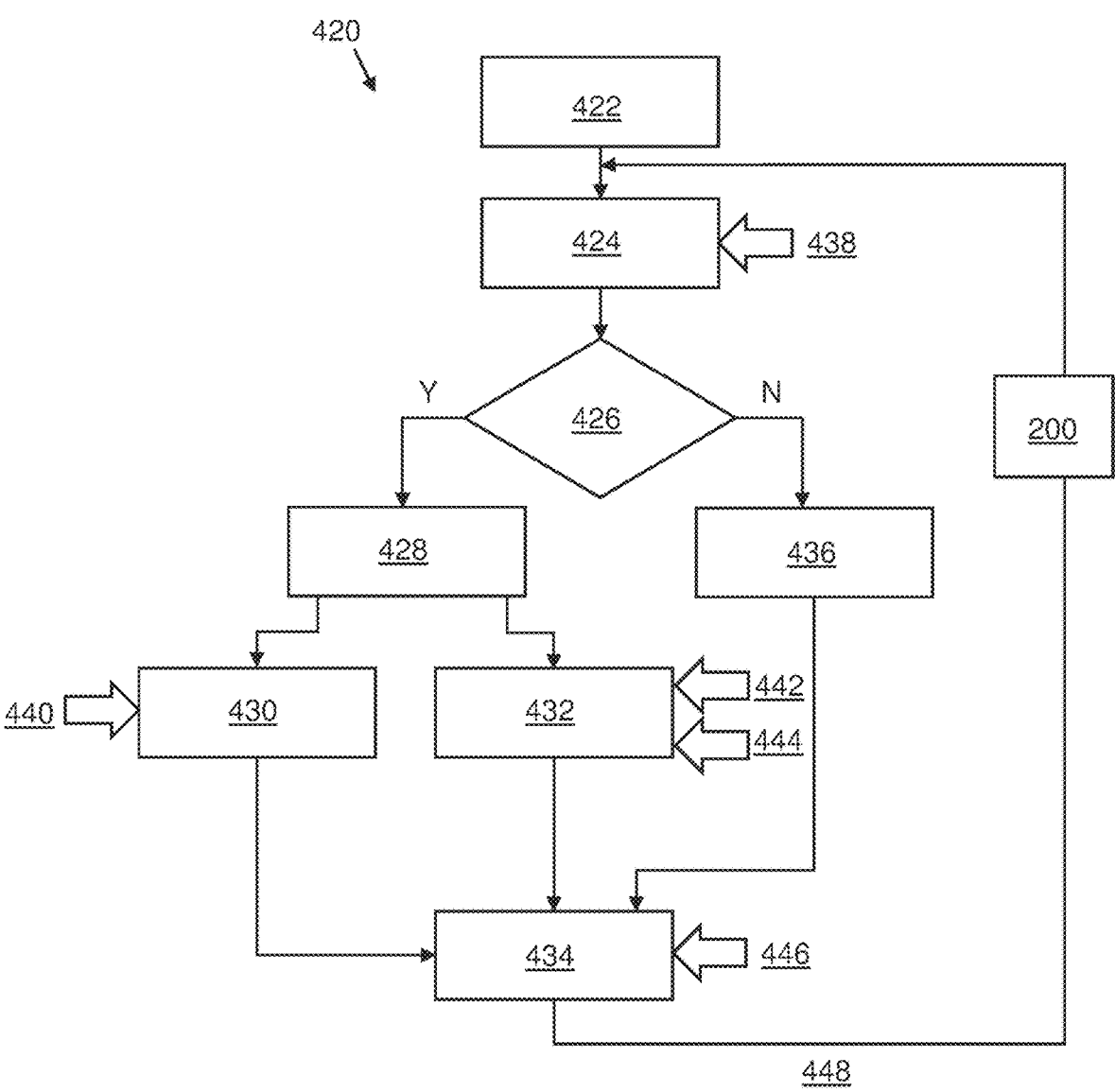

FIGS. 4a-4b show example processes 400, 420 taking place by a control system 100 to control a damper. In FIG. 4a, the control system 100 is configured to receive a temperature signal 402 indicative of an ambient temperature in an environment in which the vehicle is located. The control system 100 is configured to determine 404 if the damper is operating outside a predetermined ambient temperature range in dependence on the temperature signal 402. When the damper is determined to be operating within the predetermined ambient temperature range, the control system 100 is configured to output the electrical current request 408, unmodified, to control the damper. However, when the damper is determined to be operating outside the predetermined ambient temperature range, the control system 100 is configured to output a modified electrical current request 406 to control the damper. The modified electrical current request 406 is modified with respect to an electrical current request 408 output to the damper when the damper is determined to be operating within the predetermined ambient temperature range. The electrical current 406, 408 may control the damper by changing the size of an aperture in the damper which is turn controls the rate of fluid flow within the damper, and in turn control the damper stiffness/firmness.

FIG. 4b illustrates an example process 420 taking place with control steps performed by a control system 100. At step 422 the vehicle is undertaking normal driving, and the damping system is operating within a predetermined ambient temperature range i.e. is in normal use. At step 424, an estimation of the vehicle state takes place. As input, a signal indicating the ambient temperature 438 may be received and used to determine the vehicle state (i.e. what ambient temperature is the vehicle operating in). In other examples, the signal received as input may indicate another measure of the temperature of the damper, or other vehicle part (either directly as a temperature measurement, or indirectly as a measurement indicative of temperature, such as current). This step 424 may be performed continuously, or periodically, or at least is repeated in some way to re-check the current vehicle operating state during vehicle operation.

At step 426, the control system makes a determination whether the vehicle state is in a possibly "degraded" state i.e. a state in which a modification to the standard control of the damper 200 may be made. For example, the control system 100 may determine 426 whether the vehicle is operating within the predetermined ambient temperature range, or outside the predetermined ambient temperature range. If the vehicle is determined to be operating within the predetermined ambient temperature range (the branch marked "N") then the process moves to step 436 at which it is determined that no compensation is to be made in the damper control for a possible change in performance due to the estimated vehicle state, and then to step 434 where the damper 200 is controlled according to a damper "final" current request 448 (corresponding to a "raw" (unmodified) damping force request when the branch comprising step 436 is taken).

If the vehicle is determined to be operating outside the predetermined ambient temperature range ("Y"), then the process moves to step 428 where the control system determines that a compensation is to be made for a possible change in performance of the damper due to the estimated vehicle state. The control system may, at step 430, and based on the ambient temperature 440, determine a minimum damping level (i.e. an offset) to be applied to the damper 200. In high ambient temperature the minimum damping level may be increased to counteract a reduced viscosity of fluid in the damper, and conversely, in low ambient temperature the minimum damping level may be decreased to counteract an increased viscosity of fluid in the damper. The resulting damping level may be considered to be a "manipulated" minimum damping level in that it has been artificially adjusted to account for the ambient temperature. In other words, the modified electrical current request 448 may comprise the electrical current request offset by a constant damping level electrical current (i.e. an electrical current corresponding to application of a constant damping level). By applying an offset determined in step 430, effects of the ambient temperature 440 on the properties of the damper 200 may be counteracted to maintain a desired damper operation by shifting the current applied to the damper by the offset.

The control system may, at step 432, based on the ambient temperature 442 and an estimated damper velocity 444, determine the electrical current request 448 which should be transmitted to the damper 200 to control the damper. The damping force request may comprise a damping force which would be applied if the detected ambient temperature was not out of the predetermined ambient temperature range, multiplied by a multiplier factor. That is, the control system may be configured to determine a magnitude of an electrical current multiplier factor in dependence on a detected velocity 444 of the damper 200 in operation. A "damper in operation" may be understood to mean that the damper 200 is in use in an operative vehicle (i.e. the vehicle is being driven). A detected velocity of the damper 200 in operation may be understood to mean the velocity of one part of the damper 200 moving with respect to another part of the damper 200 to provide a damping effect (e.g. a damper piston moving inside a damper chamber). A detected damper velocity which may be determined to meet the criteria for providing an adjusted electrical current request to the damper may be the result of a "dynamic" event, such as a kerb strike, driving over a pothole, or sudden cornering/swerving, for example, which cause the parts of the damper which move relative to each other (e.g. the piston with respect to the chamber/housing) to rapidly change relative velocity. There may be a threshold relative damper component velocity which, when reached or exceeded, triggers the modification of the electrical current provided to the damper to control damper firmness.

Again, the resulting damping level provided by application of the electrical current request 448 may be considered to be a "manipulated" electrical current request in that the electrical current request 448 to cause a particular requested damping force has been artificially adjusted to account for the ambient temperature 440, 442 and the estimated damper velocity 444. For example, the modified electrical current request 448 may comprise the electrical current request, multiplied by an electrical current multiplier factor derived from a modified force request, determined at step 432. By multiplying the damping force by a multiplier factor to obtain a corresponding modified electrical current request 448 for use in controlling the variable aperture of the damper, effects of the ambient temperature 442 on the properties of the damper 200 may be counteracted to maintain a desired damper operation, by scaling an adjustment of the modification to an applied current according to the magnitude of the applied current to account for the current damper operation (i.e. dynamic operation/damper component movement).

In some examples, the modified electrical current request 448 may comprise the electrical current request derived from a modified force request, determined at step 432, and offset by a constant damping level electrical current. Thus the outputs of both steps 430 and 432 may indicate respective adjustments to both be made to the electrical current request 448, which results in the adjusted damping force request being provided by the damper according to the electrical current request 448. In this example, electrical current request modification based on the damper velocity 444 only applies to the damping force request and does not affect the minimum damping level.

The damper 200 may be in operation moving at a first velocity (e.g. smooth driving on a residential road), and the modified electrical current request 448 may comprise the electrical current request offset by a constant damping level electrical current when the first velocity is within a first velocity range, as determined in step 430. For example, between a damper velocity of 0 m/s to 0.01 m/s (a first velocity range), a constant damping level electrical current offset may be applied to the electrical current request to provide the modified electrical current request 448.

The damper 200 may be in operation moving at a second velocity within a second velocity range, wherein the second velocity range is greater than a first velocity range. The "second velocity range" may span damper velocities expected in the event of a sudden change in movement, such as the vehicle hitting a kerb, driving over a pothole, or driving over a speed bump. The modified electrical current request 448 may comprise the electrical current request multiplied by an electrical current multiplier factor as in step 432 and offset by the constant damping level electrical current as in step 430 when the second velocity is within the second velocity range. For example, between a velocity of 0.1 m/s to 5.0 m/s (a second velocity range), a constant damping level electrical current offset and a multiplier factor may both be applied to the electrical current request.

In some examples, the modified electrical current request 448 may be modified either by application of a minimum damping level as determined in step 430, or by both application of a minimum damping level as determined in step 430 and application of a modified force request as determined at step 432. In some examples, the damping force multiplier factor as applied in step 432 is continuous with velocity rather than being applied in discrete values according to particular damper velocity ranges. Similarly, in some examples, the minimum damping level as determined in step 430 may be determined according to the ambient temperature with a continuous relationship between the ambient temperature and magnitude of the applied minimum damping level. In examples in which both a minimum damping level from step 430 and a damping force multiplier from step 432 are applied, the size of the modified current may vary continuously with the ambient temperature and damper velocity rather than in discrete values according to bands/ ranges of ambient temperature and/or damper velocity.

In some examples, if the value of the current output from step 432 is below the value of the current output from step 430, only the current from step 430 passes through to step 434 to become the 'modified' current 448 provided to the damper 200. In some examples, if the current output from step 432 is above the current output from step 430, only the current from step 432 passes through to step 434 to become the 'modified' current 448 provided to the damper 200—in such a case the current from step 430 may still being generated but may not be used to control the damper aperture.

At step 434, the adjusted/manipulated/offset damping force request is determined and the damper current request 448 is provided and used to control the damper 200 (i.e. the damper force, velocity of the damper movement, and/or the current signal used to control the aperture between damper fluid chambers are determined). The estimated damper velocity 446 may be used as input here to determine the required damper current request 448 to send to the damper 200, in view of any damping current adjustment determined in step 430 or step 432, to control the damper 200.

The control system may be configured to periodically receive the temperature signal 438. The control system may periodically re-determine if the damper 200 is operating outside the predetermined ambient temperature range in dependence on the periodically received temperature signal. If there is a change of status (moving from operating within to outside the predetermined ambient temperature range, or vice versa) then the control system may provide different damper current requests as discussed above. That is, if the ambient temperature increases, the control system may pass through step 430 or 432 and determine an adjustment to the damper current request rather than step 436 where no adjustment is made.

When the damper 200 is determined in step 426 to operate above the predetermined ambient temperature range, the control system may be configured to output a modified electrical current request 448 which is a higher electrical current with respect to an electrical current request output to the damper when the damper 200 is determined to be operating within the predetermined ambient temperature range. When the damper 200 is determined in step 426 to operate below the predetermined ambient temperature range, the control system may be configured to output a modified electrical current request 448 which is a lower electrical current with respect to an electrical current request output to the damper 200 when the damper is determined to be operating within the predetermined ambient temperature range. That is, fluid in a damper 200 may become less viscous as ambient temperature increases, and thus the damper 200 may require a higher current to be provided to control the damper stiffness to a desired level compared with operating at a lower ambient temperature, by reducing the size of the aperture between damper fluid chambers. Conversely, fluid in a damper 200 may become more viscous as ambient temperature decreases, and thus the damper may require a lower current to be provided to control the damper stiffness to a desired level compared with operating at a higher ambient temperature by increasing the size of the aperture between damper fluid chambers. In other examples the converse may apply.

There may be a greater need to compensate for the ambient temperature effects on damper operation in higher ambient temperatures (hotter climates), because in cold climates, a cool ambient temperature may in part be compensated for anyway by mechanical heating, e.g. due to the damper operation (i.e. movement) and vehicle movement/ operation.

In some examples the control system may be configured to determine the modified electrical current request 448 by retrieving the modifier for the damping force request from step 432 and/or the minimum damping level value from step 430 from a memory. For example, there may be a look up table or similar stored which the control system accesses to retrieve a suitable modified electrical current request based on the ambient temperature. In some examples the control system may be configured to determine the modified electrical current request by determining the modifier for the damping force request from step 432 and/or the minimum damping level value from step 430 in accordance with one or more detected vehicle parameters. That is, the control system may use a formula or formulae to calculate the modified electrical current request based on input parameters such as ambient temperature and damper velocity. In some examples the control system may retrieve some fixed modifier value for the damping force request from step 432 and/or the minimum damping level value from step 430 from a memory and perform some calculation, such as interpolation, to obtain a suitable modified electrical current request for the particular detected conditions.

FIG. 5 illustrates an example relationship between damper force 504 and damper velocity 502. Curve 510 shows an example unmodified current relation that for a given damper velocity, applying an unmodified current $I_0$ provides a desired damping force.

Curve 506 illustrates a modified current relation in which the current relation $I_0$ is offset by a constant positive value 512. Such a current modification may be applied to provide a constant damping level electrical current, for example when the damper is moving at low velocity and at a high ambient temperature. Curve 508 illustrates a modified current relation in which the current relation $I_0$ is multiplied by a factor greater than 1 and offset by a constant current 512. Such a current modification may be applied to provide an increasing multiplier to the damping level electrical current, for example when operating at a high ambient temperature. Curve 514 illustrates a modified current relation in which the current relation $I_0$ is multiplied by a factor less than 1 and offset by a constant current 512. Such a current modification may be applied to provide a decreasing multiplier to the damping level electrical current, for example when operating at a low ambient temperature. Further curves may be envisaged which are a combination of a different offset and curve multiplier.

FIG. 6 shows an example method 600 of operation of a control system 100 for a damper 200 of a suspension system of a vehicle 700. The method 600 may be performed by the control system 100 illustrated in FIG. 1. In particular, the memory 130 may comprise computer-readable instructions (e.g. computer software) which, when executed by the processor 120 of a control system 100 disclosed herein, perform a method 600 as disclosed herein. Also disclosed herein is a non-transitory, computer-readable storage medium storing instructions thereon that, when executed by one or more electronic processors of a control system 100 as disclosed herein, causes the one or more electronic processors to carry out a method 600 as disclosed herein.

The method 600 comprises: receiving a temperature signal indicative of an ambient temperature in an environment in which the vehicle is located 602; determining if the damper is operating outside a predetermined ambient temperature range in dependence on the temperature signal 604; and when the damper is determined to be operating outside the predetermined ambient temperature range, outputting a modified electrical current request to control the damper 606, the modified electrical current request modified with respect to an electrical current request output to the damper when the damper is determined to be operating within the predetermined ambient temperature range. In some examples, the method 600 may comprise periodically receiving the temperature signal; and re-determining if the damper is operating outside the predetermined ambient temperature range in dependence on the received temperature signal, as illustrated by the loop arrow 608.

The blocks illustrated in FIG. 6 may represent steps in a method 600 and/or sections of code in a computer program configured to control the control system as described above to perform the method steps. The illustration of a particular order to the blocks does not necessarily imply that there is a required or preferred order for the blocks and the order and arrangement of the block may be varied. Furthermore, it may be possible for some steps to be omitted or added in other examples.

FIG. 7 illustrates an example vehicle according to examples disclosed herein, e.g. comprising a control system 100, damper system 300, or vehicle suspension system as disclosed herein. The vehicle 700 in the present embodiment is an automobile, such as a wheeled vehicle, but it will be understood that the control system and active suspension system may be used in other types of vehicle.

As used here, 'connected' means either 'mechanically connected' or 'electrically connected' either directly or indirectly. Connection does not have to be galvanic. Where the control system is concerned, connected means operably coupled to the extent that messages are transmitted and received via the appropriate communication means. The term "control system" may be understood to cover a controller, control module, or control element and need not necessary be a multi-element or distributed system (although it may be in some examples).

It will be appreciated that various changes and modifications can be made to the present disclosed examples without departing from the scope of the present application as defined by the appended claims. Whilst endeavouring in the foregoing specification to draw attention to those features believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a damper of a suspension system of a vehicle, the control system comprising one or more controllers, the control system configured to:

receive a temperature signal indicative of an ambient temperature in an environment in which the vehicle is located;

determine if the damper is operating outside a predetermined ambient temperature range in dependence on the temperature signal; and when the damper is determined to be operating outside the predetermined ambient temperature range, output a modified electrical current request to control the damper, the modified electrical current request being modified with respect to an electrical current request output to the damper when the damper is determined to be operating within the predetermined ambient temperature range, wherein the damper is in operation moving at a first velocity, and the modified electrical current request comprises the electrical current request offset by a constant damping level electrical current when the first velocity is within a first velocity range.

2. The control system of claim 1, wherein the modified electrical current request comprises the electrical current request offset by a constant damping level electrical current.

3. The control system of claim 1, wherein the modified electrical current request comprises the electrical current request, multiplied by an electrical current multiplier factor.

4. The control system of claim 3, wherein the control system is configured to determine a magnitude of the electrical current multiplier factor in dependence on a detected velocity of the damper in operation.

5. The control system of claim 1, wherein the damper is in operation moving at a second velocity within a second velocity range, wherein the second velocity range is greater than a first velocity range, and the modified electrical current request comprises the electrical current request multiplied by an electrical current multiplier factor and offset by the constant damping level electrical current when the second velocity is within the second velocity range.

6. The control system of claim 1, configured to:

periodically receive the temperature signal; and re-determine if the damper is operating outside the pre-determined ambient temperature range in dependence on the received temperature signal.

7. The control system of claim 1, wherein one or more of:

when the damper is determined to operate above the predetermined ambient temperature range, the control system is configured to output a modified electrical current request which is a higher electrical current with respect to an electrical current request output to the damper when the damper is determined to be operating within the predetermined ambient temperature range; and when the damper is determined to operate below the predetermined ambient temperature range, the control system is configured to output a modified electrical current request which is a lower electrical current with respect to an electrical current request output to the damper when the damper is determined to be operating within the predetermined ambient temperature range.

8. The control system of claim 1, configured to determine the modified electrical current request by one or more of:

retrieving the modified electrical current request from a memory; and determining the modified electrical current request in accordance with one or more detected vehicle parameters.

9. A vehicle comprising the control system according to claim 1 and a vehicle suspension system, the vehicle suspension system comprising the damper configured to receive the modified electrical current request from the control system to control the damper.

10. A method of operation of a control system for a damper of a suspension system of a vehicle, the method comprising:

receiving a temperature signal indicative of an ambient temperature in an environment in which the vehicle is located;

determining if the damper is operating outside a prede-termined ambient temperature range in dependence on the temperature signal; and when the damper is determined to be operating outside the predetermined ambient temperature range, outputting a modified electrical current request to control the damper, the modified electrical current request modi-fied with respect to an electrical current request output to the damper when the damper is determined to be operating within the predetermined ambient tempera-ture range, wherein the damper is in operation moving at a first velocity, and the modified electrical current request comprises the electrical current request offset by a constant damping level electrical current when the first velocity is within a first velocity range.

11. A non-transitory computer-readable medium having a set of instructions stored therein which, when executed, cause a processor to perform the method according to claim 10.

12. The method of claim 10, wherein the modified elec-trical current request comprises the electrical current request offset by a constant damping level electrical current.

13. The method of claim 10, wherein the modified elec-trical current request comprises the electrical current request, multiplied by an electrical current multiplier factor.

14. The method of claim 13, further comprising deter-mining a magnitude of the electrical current multiplier factor in dependence on a detected velocity of the damper in operation.

15. The method of claim 10, wherein the damper is in operation moving at a second velocity within a second velocity range, wherein the second velocity range is greater than a first velocity range, and the modified electrical current request comprises the electrical current request multiplied by an electrical current multiplier factor and offset by the constant damping level electrical current when the second velocity is within the second velocity range.

16. The method of claim 10, further comprising:

periodically receiving the temperature signal; and re-determining if the damper is operating outside the predetermined ambient temperature range in depen-dence on the received temperature signal.

17. The method of claim 10, further comprising:

when the damper is determined to operate above the predetermined ambient temperature range, outputting a modified electrical current request which is a higher electrical current with respect to an electrical current request output to the damper when the damper is determined to be operating within the predetermined ambient temperature range; and when the damper is determined to operate below the predetermined ambient temperature range, outputting a modified electrical current request which is a lower electrical current with respect to an electrical current request output to the damper when the damper is determined to be operating within the predetermined ambient temperature range.

18. The method of claim 10, wherein determining the modified electric current request comprises one or more of:

retrieving the modified electrical current request from a memory; and determining the modified electrical current request in accordance with one or more detected vehicle param-eters.

* * * * *